Aug. 31, 1954

J. BOLSEY 2,687,669

MOTION-PICTURE CAMERA LENS AND FILTER TURRET LOCKING MECHANISM

Filed June 27, 1951

INVENTOR.
Jacques Bolsey
BY
Michael Johnson

Aug. 31, 1954

J. BOLSEY 2,687,669

MOTION-PICTURE CAMERA LENS AND FILTER
TURRET LOCKING MECHANISM

Filed June 27, 1951

INVENTOR.
Jacques Bolsey
BY

Patented Aug. 31, 1954

2,687,669

UNITED STATES PATENT OFFICE 2,687,669

MOTION-PICTURE CAMERA LENS AND FILTER TURRET LOCKING MECHANISM

Jacques Bolsey, New York, N. Y.

Application June 27, 1951, Serial No. 233,806

9 Claims. (Cl. 88—16)

My present application is a continuation-in-part of my co-pending U. S. application Serial No. 168,514 which is a division of my co-pending U. S. application Serial No. 65,473, filed December 15, 1948, for "Cinematographic Cameras," which application has matured into Patent No. 2,515,330, issued on July 18, 1950, and which application, in turn, is a division of my co-pending U. S. patent application Serial No. 657,282, filed March 26, 1946, and entitled "Cinematographic Cameras," the latter application having matured into Patent No. 2,462,302, issued on February 22, 1949.

My present invention relates to cinematographic cameras or still cameras and more particularly to cameras provided with movable lens carrying turrets.

It is an object of my present invention to provide blocking means which prevent operation of the camera shutter if none of the lenses is in proper picture taking position.

Another object of my present invention is to provide a blocking means which prevents operation of the camera shutter if none of the filters of the camera are located in proper picture taking operation.

A further object of my present invention is to simultaneously lock the lens turret and filter disc of the camera in proper position during operation of the camera.

A still further object of my present invention is to prevent operation of the camera except when a filter disc and lens turret are located in proper position.

Another object of my present invention is to provide a structure of the above-described type which is exceedingly simple and reliable in operation.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
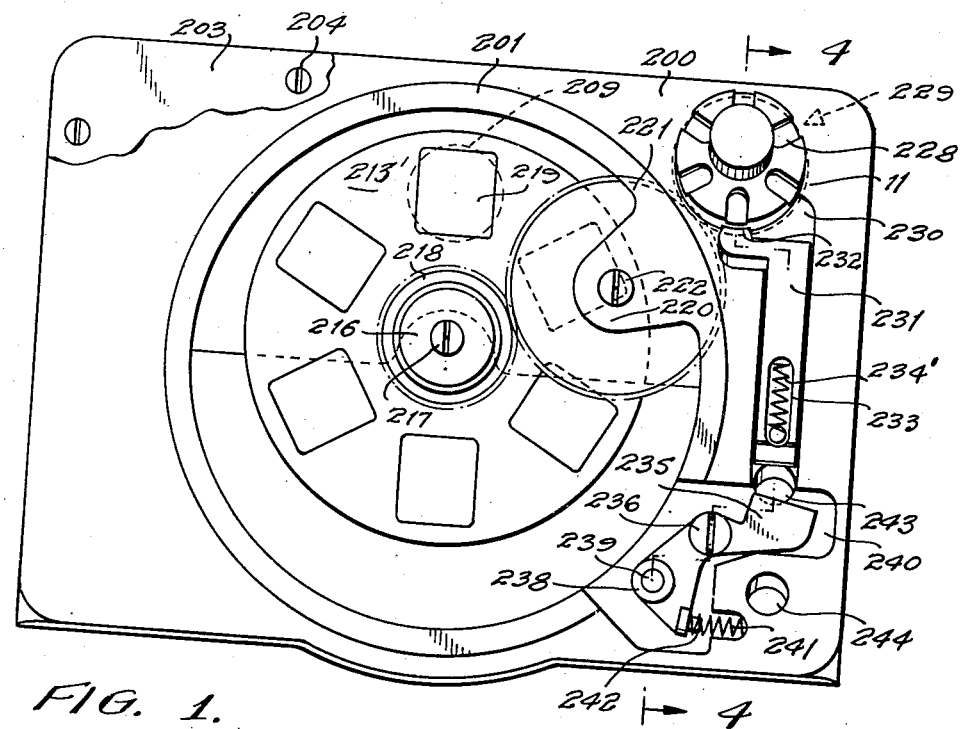
Fig. 1 is a front view of an embodiment of my present invention with the lens turret removed and with a cover plate cut away for clarity.
Figure 2:
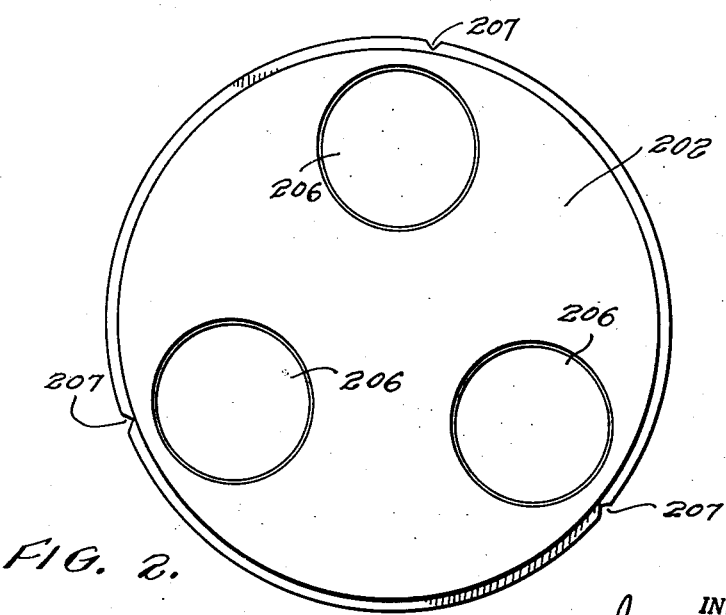
Fig. 2 is an elevational front view of the lens turret.
Figure 3:
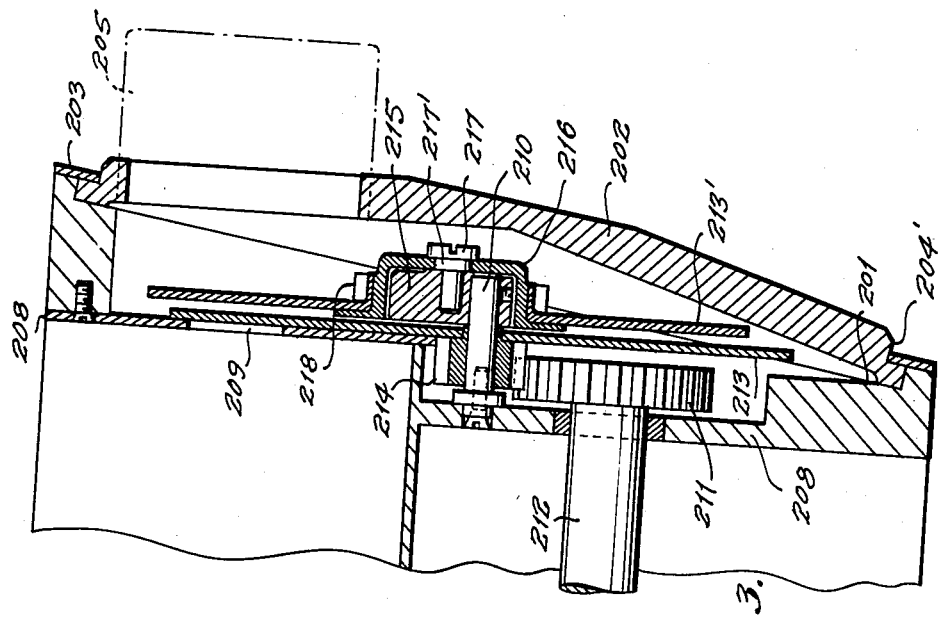
Fig. 3 is a sectional side view of the front portion of the camera shown in Fig. 1.

Referring to Fig. 1, there is shown an embodiment of my present invention comprising a camera housing 200 having a circular lens turret supporting-surface 201 formed in the same. The lens turret 202, shown in Figs. 2 and 3, is adapted to be mounted on surface 201 for rotation and is maintained in position by cover plate 203 which is fastened to the camera housing 200 by any suitable means such as screws 204. The lens turret 202 has a central raised portion 204' extending through an opening formed in cover plate 203, and turret 202 has a plurality of threaded openings formed therein for the purpose of supporting a plurality of lenses, one of which is shown in dotted lines at 205 in Fig. 3. The turret 202 is rotated by the operator simply by grasping one of the lenses extending from the turret 202 and turning the latter on its seat 201. In Fig. 2, the turret 202 is shown as having three openings 206 for supporting three lenses, and the periphery of the turret is formed with a number of recesses 207 which correspond to the number of openings 206.

The camera housing 200 includes a wall portion 208 formed with an exposure aperture 209, as shown in Fig. 3, and turret 202 may be rotated so as to rotate the lenses thereon consecutively into alignment with the optical axis extending through aperture 209.

A shaft 210 is fixedly mounted at one end thereof to the wall 208, and this shaft 210 supports at the other end thereof bearing 215 which is fixedly connected to the shaft 210 by any suitable means such as a set screw for example. Rotatably mounted on shaft 210 is a gear 214 which is fixedly connected to the shutter 213 mounted about shaft 210 so that the shutter 213 turns about shaft 210 with the rotation of gear 214. Gear 214 meshes with gear 211 which is connected to a drive means fragmentarily shown at 212, so that when the latter is operated gears 211 and 214 rotate shutter 213. Support member 216 is mounted for free rotation upon bearing 215 by means of the screw member 217 which has a smooth portion 217' adjacent the head thereof engaging an opening in member 216. Fixedly mounted on support member 216 for rotation therewith is filter disc 213' and gear 218. As is shown in Fig. 1, filter disc 213' has a plurality of filters mounted thereon, and in the position shown in Fig. 1 the filter 219 is located in alignment with the optical axis and over the exposure aperture 209.

The camera housing 200 has a projecting portion 220 extending from the turret supporting portion 201 thereof, and this projecting portion 220 rotatably supports the gear 221 thereon by any suitable means, such as for example the screw member 222. Gear 221 meshes with gear 223, shown most clearly in Fig. 4, and this latter gear is fixedly connected by means of screw 224, for example, which extends through a wall of housing 200, to an end of the shaft 225 located on the other side of the housing wall from the gear 223. Fixedly connected to the shaft 225, by means of a set screw for example, is the knob 226. It is apparent that rotation of knob 226 causes rotation of shaft 225 which in turn rotates gear 223 so as to thereby cause rotation of gears 221 and 218 which in turn rotate the filter disc 213'.

The knob 226 has formed in its periphery a plurality of spaced apertures 227 which correspond in number to the number of filters on filter disc 213' and which have located thereover different color indications 228 which cooperate with an index 229, shown in dotted lines in Fig. 1 and actually located on cover plate 203, so that the operator will know which of the filters is in operative position.

Figure 4:
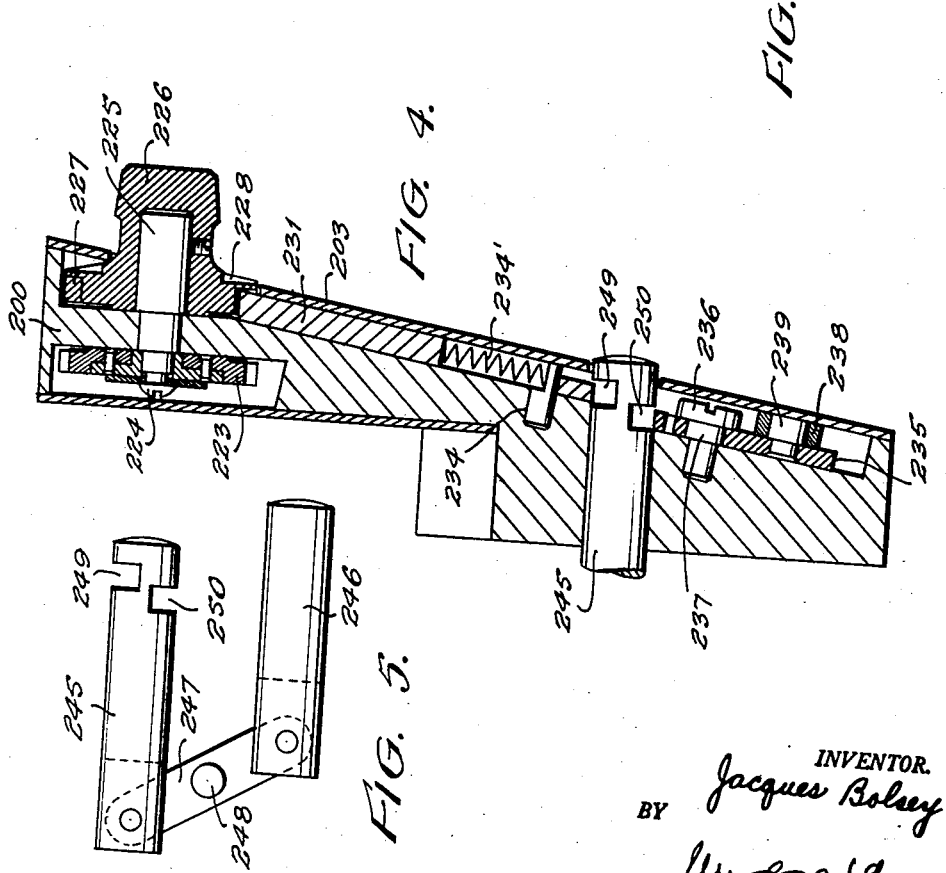
Fig. 4 is a sectional elevational view taken along the line 4—4 of Fig. 1.

Mounted in a groove 230 in the camera housing 200 is elongated stop member 231 which has an end portion 232 shaped so as to fit into the recesses 227. Stop member 231 has an elongated slot 233 formed therein, and in this slot there is located a spring 234' which bears at one end thereof against the upper end of slot 233, shown in Fig. 1, and which bears with its other end against a flat portion of pin 234 fixedly mounted in camera housing 200, as shown in Fig. 4. The outer portion of pin 234 is located in the lower part of slot 233, as viewed in Fig. 1, and by this construction spring member 234' urges end portion 232 of stop member 231 toward the periphery of knob 226 so that when one of the recesses 227 is located in alignment with end portion 232 of stop member 231, the spring 234 will urge end portion 232 into one of the recesses 227.

The lever member 235 is pivotally mounted in housing 200 by means of the screw member 236 which has a smooth portion 237 engaging an opening in the lever member 235. This lever member rotatably supports roller 238 thereon by means of the shaft 239 fixedly connected at one end thereof to the lever 235. The lever 235 is supported in a recess 240 in the camera housing 200 so that the roller 238 is located at the level of the periphery of turret 202. Mounted on the housing 200 is the spring 241 bearing with one end thereof against a recess in the housing 200 and bearing with the other end thereof against the lever 235. This other end of spring 241 is maintained in alignment with lever 235 by any suitable means such as the projecting member 242 connected to the lever and extending into the spring 241. Spring 241 urges lever 235 about its pivot 236 toward the periphery of turret 202 so that when one of the recesses 207 is located opposite roller 238, the latter will be moved into one of the recesses 207 by the spring 241.

Camera housing 200 is formed with a pair of openings 243 and 244 in which the rods 245 and 246, shown in Fig. 15, are respectively located for sliding movement. The rods 245 and 246 are pivotally connected at their inner ends to the member 247 which is pivotally connected at 248 to a part of the camera housing. Rod 245 is a stop button for stopping the driving mechanism 212 of the camera and rod 246 is a starting button for starting the driving mechanism of the camera.

Figure 5:
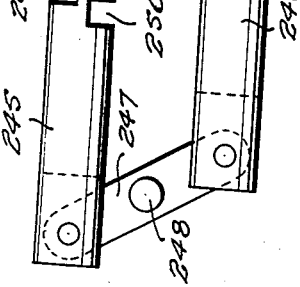
Fig. 5 is an elevational view of a detail of the device shown in Fig. 1.

When it is desired to stop the driving mechanism, rod 245 is pushed inwardly so as to thereby move rod 246 outwardly, by means of lever 247. Rod 245 is formed on opposite sides thereof with cutouts 249 and 250, as shown in Figs. 4 and 5, and these cut-outs are so located that when the rod 245 is in its inward position and the driving mechanism 212 is stationary, the cut-out portion 249 is located in alignment with the lower end of stop member 231 and cut-out portion 250 is located in alignment with the upper end of lever 235. It will be noted that springs 234 and 242 urge stop member 231 and lever 235, respectively, away from rod 245. It will be seen from Fig. 4 that cover plate 203 is located over the springs 234 and 242 and over the stop member 231 and lever 235 as well as roller 238, so that only the stop and start rods 245 and 246 extend outwardly through openings in the cover plate 203.

When the drive mechanism 212 is stationary and rod 245 is in the position shown in Fig. 4, it is possible to rotate the knob 226 and turret 202 so as to locate a different filter and lens on the optical axis. The rotations of knob 226 and turret 202 cause the peripheries of these elements to respectively move the stop member 231 and lever 235. The periphery of turret 202 pivots lever 235 so that the upper portion thereof moves into cut-out portion 250 of rod 245, and the periphery of knob 226 moves stop member 231 downwardly, as viewed in Fig. 1, so that its lower end moves into the cut-out 249 of rod 245. As long as the roller 238 and portion 232 of stop member 231 are not located in any recess, the upper part of lever 235 and the lower part of stop member 231 will be respectively located in the cut-outs 250 and 249 so that it will not be possible to move the rod 246 inwardly to start the drive means 212. In this way an effective means is provided for preventing operation of the camera at those times when a lens and filter are not located on the optical axis.

The recesses 207 in the periphery of turret 202 are located so as to respectively engage roller 238 when the lenses respectively corresponding to the recesses 207 are respectively located on the optical axis. Thus, when roller 238 is located in one of the recesses 207 and when the upper portion 232 of stop member 231 is located in one of the recesses 227, the upper part of lever 235 is moved out of cut-out 250 by spring 242, and the lower part of stop member 231 is moved out of cut-out 249 by spring 234, and in this position of the parts rod 246 may be moved inwardly to start the drive mechanism 212, and by means of the lever 247 the rod 245 is moved outwardly to the right of the position shown in Fig. 4. It will be noted that in this latter position of the parts the outer surface of rod 245 engages the upper extremity of lever 235 and the lower extremity of stop member 231 so that it is not possible for stop member 231 to move downwardly or for lever 235 to turn in counterclockwise direction about pivot 236, as viewed in Fig. 1. It is apparent, therefore, that when the drive means 212 is operated the rod 245 serves to lock the lever 235 and stop member 231 in position with the roller 238 located in one of the recesses 207 and with the upper portion 232 of stop member 231 in one of the recesses 227, and in this way the turret 202 and the filter disc 213 are both locked in proper picture taking position during the operation of the drive 212.

It will be understood that each of the elements described above, or two or more together, may also find a useful application in other types of cinematographic cameras differing from the types described above.

While I have illustrated and described the invention as embodied in cinematographic cameras provided with turret heads, I do not intend to be limited to the details shown, since various modifications and structural changes may be made without departing in any way from the spirit of my invention.

What I claim as new and desire to secure by Letters Patent is:

1. In a cinematographic camera, in combination, a camera housing having a wall thereof formed with an exposure aperture extending through the same; a filter disc rotatably mounted in said camera housing ahead of said wall so that the filters on said filter disc may be consecutively located over said exposure aperture; operating means mounted on said camera housing and being connected to said filter disc for rotating the same so as to enable a desired filter to be located over said exposure aperture, said operating means comprising a rotatably mounted knob located on said camera housing and gear means interconnecting said knob and filter disc so that the latter rotates upon rotation of said knob, said knob being formed with a plurality of spaced recesses extending into the periphery thereof and corresponding in number to the number of filters on said filter disc; stop means operatively connected to said operating means for stopping the same at a plurality of positions corresponding to the positions of said filter disc when the respective filters are located over said exposure aperture, said stop means comprising an elongated movably mounted member having a portion thereof adapted to be moved into and out of said recesses by movement of said knob; spring means operatively connected to said elongated member for urging said portion thereof against the periphery of said knob; and locking means operatively connected to said stop means for locking the same in stopping position.

2. In a cinematographic camera, in combination, a camera housing having a wall thereof formed with an exposure aperture extending through the same; a filter disc rotatably mounted in said camera housing ahead of said wall so that the filters on said filter disc may be consecutively located over said exposure aperture; operating means mounted on said camera housing and being connected to said filter disc for rotating the same so as to enable a desired filter to be located over said exposure aperture, said operating means comprising a rotatably mounted knob located on said camera housing and gear means interconnecting said knob and filter disc so that the latter rotates upon rotation of said knob, said knob being formed with a plurality of spaced recesses extending into the periphery thereof and corresponding in number to the number of filters on said filter disc; stop means operatively connected to said operating means for stopping the same at a plurality of positions corresponding to the positions of said filter disc when the respective filters are located over said exposure aperture, said stop means comprising an elongated movably mounted member having a portion thereof adapted to be moved into and out of said recesses by movement of said knob; spring means operatively connected to said elongated member for urging said portion thereof against the periphery of said knob; and locking means operatively connected to said stop means for locking the same in stopping position, said locking means comprising an elongated movably mounted rod movable between one position where it prevents movement of said portion of said elongated member out of said recesses and another position where it permits movement of said portion of said elongated member out of said recesses.

3. In a cinematographic camera, in combination, a camera housing having a wall thereof formed with an exposure aperture extending through the same; a filter disc rotatably mounted in said camera housing ahead of said wall so that the filters on said filter disc may be consecutively located over said exposure aperture; operating means mounted on said camera housing and being connected to said filter disc for rotating the same so as to enable a desired filter to be located over said exposure aperture, said operating means comprising a rotatably mounted knob located on said camera housing and gear means interconnecting said knob and filter disc so that the latter rotates upon rotation of said knob, said knob being formed with a plurality of spaced recesses extending into the periphery thereof and corresponding in number to the number of filters on said filter disc; stop means operatively connected to said operating means for stopping the same at a plurality of positions corresponding to the positions of said filter disc when the respective filters are located over said exposure aperture, said stop means comprising an elongated movably mounted member having a portion thereof adapted to be moved into and out of said recesses by movement of said knob; spring means operatively connected to said elongated member for urging said portion thereof against the periphery of said knob; and locking means operatively connected to said stop means for locking the same in stopping position, said locking means comprising an elongated movably mounted rod having a cut-out portion formed therein and being movable between one position where the outer surface of said rod engages said elongated member to hold said portion thereof in one of said recesses and another position where said cut-out portion of said rod is located in alignment with said elongated member so as to permit movement of said portion thereof out of said recesses.

4. In a cinematographic camera, in combination, a camera housing having a wall thereof formed with an exposure aperture extending through the same; a shutter mechanism located in said camera housing; drive means operatively connected to said shutter mechanism for driving the same; a filter disc rotatably mounted in said camera housing ahead of said wall so that the filters on said filter disc may be consecutively located over said exposure aperture; operating means mounted on said camera housing and being connected to said filter disc for rotating the same so as to enable a desired filter to be located over said exposure aperture, said operating means comprising a rotatably mounted knob located on said camera housing and gear means interconnecting said knob and filter disc so that the latter rotates upon rotation of said knob, said knob being formed with a plurality of spaced recesses extending into the periphery thereof and corresponding in number to the number of filters on said filter disc; stop means operatively connected to said operating means for stopping the same at a plurality of positions corresponding to the positions of said filter disc when the respective filters are located over said exposure aperture, said stop means comprising an elongated movably mounted member having a portion thereof adapted to be moved into and out of said recesses by movement of said knob; spring means operatively connected to said elongated member for urging said portion thereof against the periphery of said knob; and locking means operatively connected to said stop means for locking the same in stopping position, said locking means comprising an elongated movably mounted drive means control rod having a cut-out portion formed therein and being movable between one position where it permits the operation of said drive means and where the outer surface of said rod engages said elongated member to hold said portion thereof in one of said recesses and another position where it prevents the operation of said drive means and where said cut-out portion of said rod is located in alignment with said elongated member so as to permit movement of said portion thereof out of said recesses, said elongated member having another portion located in said cut-out portion of said elongated rod when the latter is located in said other position and when said one portion of said elongated member is located out of said recesses, whereby movement of said rod into said one position is permitted only when said one portion of said elongated member is located in one of said recesses to thereby prevent operation of said drive means when said filter disc is not located with one of the filters thereof over said exposure aperture.

5. In a cinematographic camera having a filter disc, lens turret, and shutter drive means, in combination, an elongated rod movable between a starting position where the shutter drive means of the camera is operated and a stop position where the shutter drive means of the camera is stopped, said rod having a pair of spaced cut-outs formed in the same; filter disc control means mounted for movement between one position when the filter disc is properly located and another position when the filter disc is improperly located, said filter disc control means having a portion thereof located in one of said cut-outs when said filter disc control means is in said other position and said rod is in said stop position; and lens turret control means mounted for movement between one position when the turret is properly located and another position when the turret is improperly located, said turret control means having a portion thereof located in the other of said cut-outs when said turret control means in said other position and said rod is in said stop position, whereby movement of said rod into starting position is permitted only when the filter disc and lens turret of the camera are properly located.

6. In a cinematographic camera having a filter disc, lens turret, and shutter drive means, in combination, an elongated rod movable between a starting position where the shutter drive means of the camera is operated and a stop position where the shutter drive means of the camera is stopped, said rod having a pair of spaced cut-outs formed in the same; filter disc control means mounted for movement between one position when the filter disc is properly located and another position when the filter disc is improperly located, said filter disc control means having a portion thereof located in one of said cut-outs when said filter disc control means is in said other position and said rod is in said stop position; lens turret control means mounted for movement between one position when the turret is properly located and another position when the turret is improperly located, said turret control means having a portion thereof located in the other of said cut-outs when said turret control means in said other position and said rod is in said stop position, whereby movement of said rod into starting position is permitted only when the filter disc and lens turret of the camera are properly located; and spring means operatively connected to said filter disc control means and lens turret control means for simultaneously urging said portions thereof out of said cut-outs.

7. In a cinematographic camera having a filter disc, lens turret, and shutter drive means, in combination, an elongated rod movable between a starting position where the shutter drive means of the camera is operated and a stop position where the shutter drive means of the camera is stopped, said rod having a pair of spaced cut-outs formed in the same; filter disc control means mounted for movement between one position when the filter disc is properly located and another position when the filter disc is improperly located, said filter disc control means having a portion thereof located in one of said cut-outs when said filter disc control means is in said other position and said rod is in said stop position; and lens turret control means mounted for movement between one position when the turret is properly located and another position when the turret is improperly located, said turret control means having a portion thereof located in the other of said cut-outs when said turret control means in said other position and said rod is in said stop position, whereby movement of said rod into starting position is permitted only when the filter disc and lens turret of the camera are properly located, said elongated rod having an outer surface portion thereof engaging said portions of said filter disc control means and lens turret control means when both of the latter are located in said one position and when said elongated rod is located in said starting position so as to thereby prevent movement of both of said control means into said other position while said rod is in said starting position.

8. In a cinematographic camera, in combination, a camera housing having a front wall formed with an exposure aperture passing therethrough; a filter disc turnably mounted on said front wall and adapted to have the filters thereof respectively located over said exposure aperture; a lens carrying turret turnably mounted on said front wall of said camera housing and adapted to have the lenses thereof respectively located over said exposure aperture; an elongated member movably mounted on the camera housing for starting the operation of the camera; and lock means operatively engaging said filter disc and lens turret to be operated thereby and operatively engaging said elongated member for locking the same, to thereby prevent operation of the camera, when one of the lenses on said turret is not located over said exposure aperture or when one of the filters on said filter disc is not located over said exposure aperture.

9. In a cinematographic camera, in combination, a camera housing having a front wall formed with an exposure aperture passing therethrough; a filter disc turnably mounted on said front wall and adapted to have the filters thereof respectively located over said exposure aperture; a lens carrying turret turnably mounted on said front wall of said camera housing and adapted to have the lenses thereof respectively located over said exposure aperture; an operating member movably mounted on the camera housing for starting the operation of the camera; and means for preventing movement of said operating member to start the operation of the camera when one of the lenses on said turret is not located over said exposure aperture and when one of the filters on said filter disc is not located over said exposure aperture and for preventing turning of said turret and filter disc after said operating member has been moved to start the operation of the camera, said means operatively engaging said filter disc and lens turret to be operated thereby for preventing movement of said operating member to start the operation of the camera when a filter and lens is not located over said exposure aperture and said means operatively engaging said operating member to prevent turning of said turret and disc after said operating member has been moved to start the operation of the camera.

References Cited in the file of this patent

UNITED STATES PATENTS

| Number | Name | Date |
|---|---|---|
| 1,893,327 | Howell | Jan. 3, 1933 |
| 2,021,765 | Billing | Nov. 19, 1935 |
| 2,192,520 | Levy et al. | Mar. 5, 1940 |
| 2,399,658 | Banker | May. 7, 1946 |

FOREIGN PATENTS

| Number | Country | Date |
|---|---|---|
| 511,828 | Great Britain | Aug. 24, 1938 |